United States Patent [19]
McLyman

[11] 4,245,288
[45] Jan. 13, 1981

[54] ELIMINATION OF CURRENT SPIKES IN BUCK POWER CONVERTERS

[76] Inventor: Robert A. Frosch, Administrator of the National Aeronautics and Space Administration, with respect to an invention of William T. McLyman, Lakewood, Calif.

[21] Appl. No.: 956,166

[22] Filed: Oct. 31, 1978

[51] Int. Cl.³ .............................................. H02M 1/14
[52] U.S. Cl. ...................................... 363/40; 363/21; 363/26; 363/47
[58] Field of Search ....................... 363/21, 26, 39–40, 363/47, 75, 82, 90–91, 101; 323/DIG. 1, 17, 52–53, 55–56; 307/280, 300, 319

[56] References Cited
U.S. PATENT DOCUMENTS

| | | | |
|---|---|---|---|
| 3,076,131 | 1/1963 | Weil | 363/91 X |
| 3,740,639 | 6/1973 | Easter | 363/21 |
| 3,745,443 | 7/1973 | Weil | 363/47 X |
| 3,870,943 | 3/1975 | Weischedel et al. | 363/26 |
| 4,034,280 | 7/1977 | Cronin et al. | 363/124 X |

*Primary Examiner*—William M. Shoop
*Assistant Examiner*—Peter S. Wong
*Attorney, Agent, or Firm*—Monte F. Mott; John R. Manning; Paul F. McCaul

[57] ABSTRACT

Current spikes in a buck power converter due to commutating diode turn-off time is eliminated by using a tapped inductor in the converter with the tap connected to the switching transistor, without the commutating diode in the usual place, and instead connected to conduct current from one end of the tapped inductor remote from the load during the interval in which the transistor is not conducting. In the case of a converter having a center-tapped (primary and secondary) transformer between two switching power transistors operated in a push-pull mode and two rectifying diodes in the secondary circuit, current spikes due to transformer saturation are also eliminated by using a tapped inductor in the converter with the tap connected to the rectifying diodes and a diode connected to conduct current from one end of the tapped inductor remote from the load during the interval in which the transistors are not conducting.

7 Claims, 16 Drawing Figures

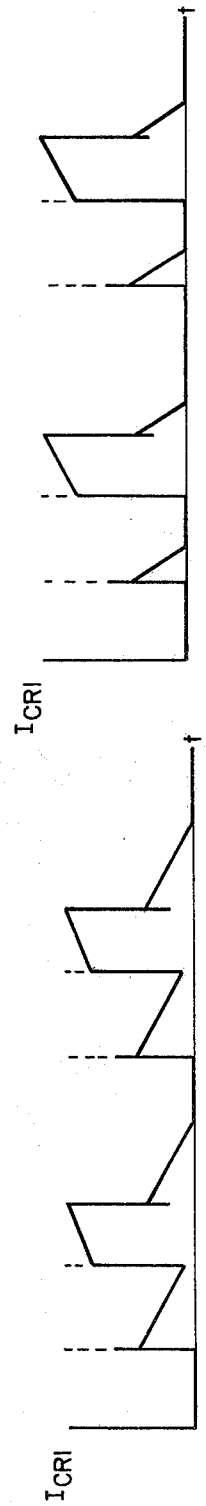
FIG. 8
FIG. 9
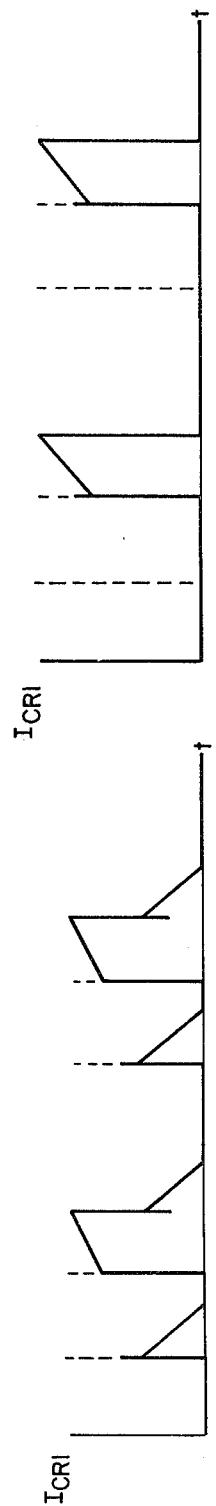
FIG. 10
FIG. 11

ELIMINATION OF CURRENT SPIKES IN BUCK POWER CONVERTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to DC-to-DC power converters, and more particularly to a technique for eliminating current spikes generated by turn-off of commutating diodes in buck power converters, and in the case of a buck power converter with an isolating transformer between rectifying diodes and a switching transistor, for eliminating spikes due to turn-off of the rectifying diodes and to transformer saturation while both switching transistors are turned off.

There has been premature failure of switching power transistors in buck converters due to current spikes generated in the converter that have been determined to be a result of diode turn-off time, and in the case of a center-tapped (primary and secondary) transformer also being used, particularly in a push-pull power switching arrangement, a result of turn-off of rectifying diodes and transformer saturation while both switching transistors are turned off. The later results because the rectifying diodes have unequal currents. Large current spikes cause undue stress on the switching transistors, and that can only lead to premature failure. While there may be other causes of current spikes in a particular converter circuit, this invention is concerned with only these sources.

SUMMARY OF THE INVENTION

In a buck power converter having a switching transistor and a commutating diode to alternately connect a source of DC power and circuit ground to an inductance which then provides power to a load, current spikes due to diode switching are eliminated by use of a tapped inductor for the inductance having its tapping terminal connected to the switching transistor and the commutating diode connected to conduct current from one end of the tapped inductor remote from the load during the interval in which the transistor is not conducting. In such a converter also having an isolating transformer between two switching power transistors operated in a push-pull mode and two rectifying diodes, the tapping terminal is connected to the rectifying diodes and the commutating diode is connected to the one end of the tapped inductor remote from the load to eliminate current spikes due to a rectifying diode being turned off and due to transformer saturation while both transistors are turned off.

The novel features of the invention are set forth with particularity in the appended claims. The invention will best be understood from the following description when read in conjunction with the accompanying drawings.

BRIEF DESCRIPTION OF THE DRAWINGS

FIGS. 8-11 illustrate current waveforms through switching diodes CR1 and CR2 for different output inductor winding ratios of a center-tapped (primary and secondary) transformer in the circuit of FIG. 7b.

DESCRIPTION OF PREFERRED EMBODIMENTS

Figure 1:
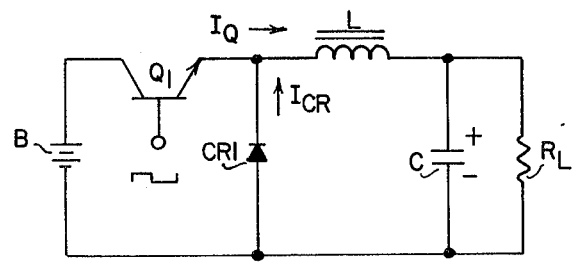
FIG. 1 illustrates a prior-art circuit diagram of a basic buck power converter.
Figure 2:
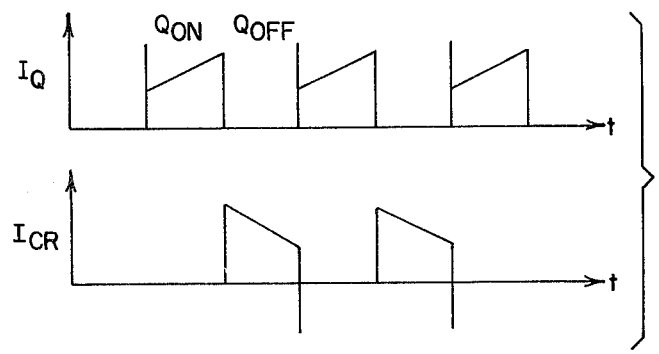
FIG. 2 illustrates waveforms of current through the switching transistor and commutating diode of the buck power converter in FIG. 1.

Before proceeding with a description of preferred embodiments, a problem of the prior-art buck power converter shown in FIG. 1 will be discussed. A bipolar transistor $Q_1$ and switching or commutating diode CR1 achieves DC-to-DC conversion by control of the time the transistor is turned on. Current to a load $R_L$ from a DC power source B is conducted by the transistor during this "on" period. This current, labeled $I_Q$ in FIG. 1, is shown in FIG. 2 as a pulsating current. While the transistor $Q_1$ is turned off, the diode CR1 is switched on to provide a current $I_{CR}$ as shown in FIG. 2. Although shown with a 50% duty ratio, it is clear that the period of the on pulses may be increased or decreased, to regulate power to the load as the transistor is turned on at some constant switching frequency. An inductor L and capacitor C filter the current pulses applied to the load.

The problem with such a buck converter is premature failure of the switching transistor when used in switching regulator circuits. The cause of such failures has been undue stress arising from large current spikes. Others have directed effort to elimination of such spiking by various means. This invention is directed to elimination or minimization of spiking arising from causes which are different from those previously recognized and treated by others. The causes of spiking to which this invention is related are the turn-off time of the commutating diode CR1, and in the case of using a transformer T1 with two power transistors $Q_1$ and $Q_2$, the turn off-times of rectifying diodes CR1 and CR2 shown in FIG. 3.

Figure 3:
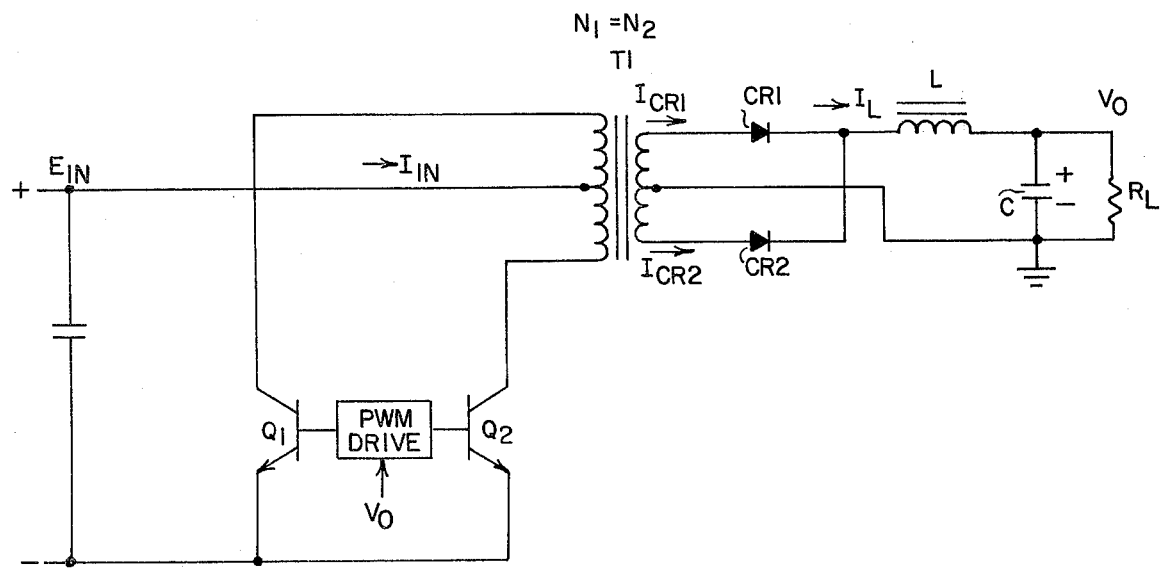
FIG. 3 illustrates a prior-art circuit diagram of a pulse width modulated buck power converter with two switching transistors and a center tapped (primary and secondary) transformer operated in a push-pull mode with two rectifying diodes in the secondary winding circuit.

Transistor $Q_1$ and rectifying diode CR1 in the converter of FIG. 3 occupy positions very similar to that of the transistor $Q_1$ and commutating diode CR1 in the converter of FIG. 1. For that reason the same reference numerals are being retained while a second transistor $Q_2$ and a second rectifying diode CR2 is added in the circuit of FIG. 3. Current spikes due to the turn off of the rectifying diodes CR1 and CR2 are very similar to the current spikes due to the turn off of the commutating diode CR1 in the circuit of FIG. 1, although the rectifying diodes CR1 and CR2 in the circuit of FIG. 3 also give rise to other current spikes, as will presently be described.

In a basic buck converter circuit shown in FIG. 1, the function of the diode is to provide a current path for the inductor L during the interval in which the transistor $Q_1$ is not conducting. The load current "commutates" between the transistor and the diode. The relationship between transistor current $I_Q$ and diode current $I_{CR}$ is shown in FIG. 2. The spikes in the current waveforms occur when the diode turns off and is due to a phenomenon known as "minority-carrier sweepout." The effect is that, immediately after the transistor $Q_1$ is turned on, the diode acts as a short circuit for a finite period of time, thereby causing a current spike through the transistor. The transistor will fail if the current values become large.

The same problem of diode turn-off exhibited by the basic buck converter circuit of FIG. 1 is also exhibited by other switching regulators utilizing the buck converter. The pulse-width modulated converter shown in FIG. 3 is the most common design in switching circuits presently available, and it also has diode turn-off problems, as noted hereinbefore. The circuit of FIG. 3 combines a pulse width modulator (PWM) with two transistors $Q_1$ and $Q_2$ in a push-pull converter arrangement. The transformer T1 in the circuit is another source of transistor current spikes which the innovation eliminates. The current spikes are introduced when the transformer core saturates, as will now be described.

Figure 4:
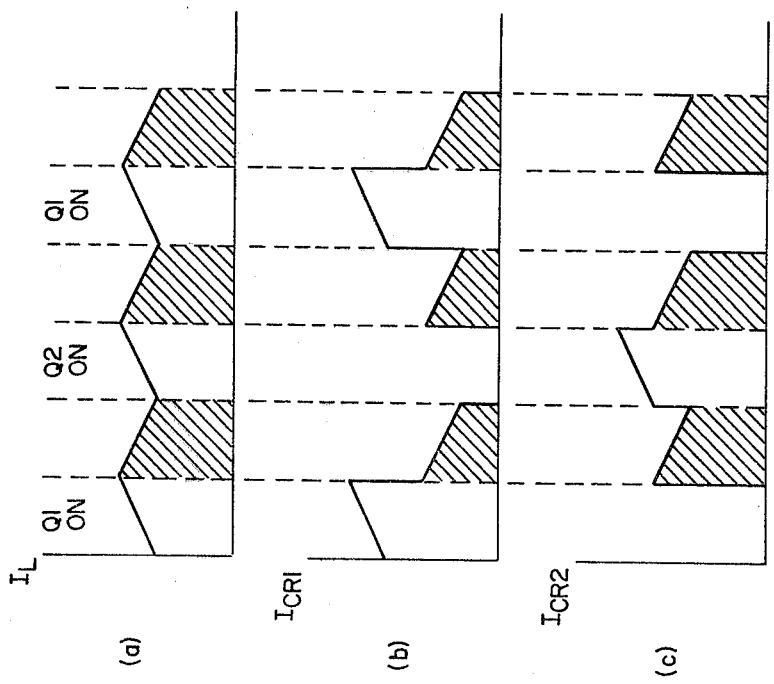
FIG. 4 illustrates waveforms of current in the inductance and switching diodes of the circuit of FIG. 3.

Assume that the transistors operate at a 50 percent duty ratio for the waveforms of FIG. 2 which have been idealized. FIG. 4 shows the load current, $I_L$, and the switching diode currents $I_{CR1}$ and $I_{CR2}$ shown. The spiking problems of the power transistors are related to two features of the diode waveforms. The diode currents are not zero prior to power transistor turn-on, and the currents are not equal when both power transistors are turned off.

Figure 5:
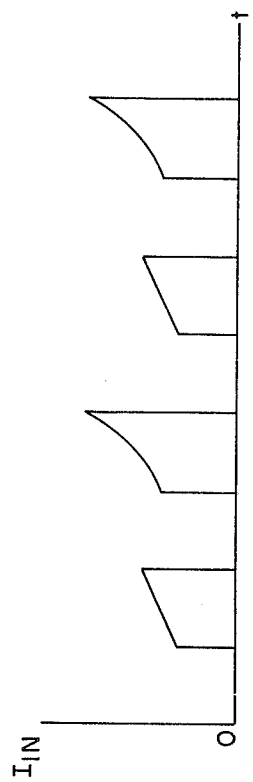
FIG. 5 illustrates a B-H loop for the transformer in the circuit of FIG. 3.
Figure 6:
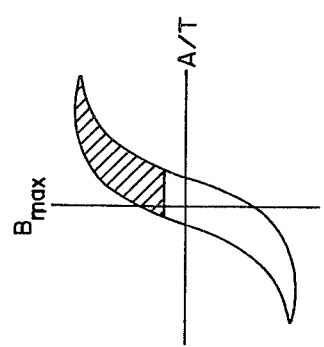
FIG. 6 is a waveform of input current to the primary winding of the transformer of FIG. 3.
Figure 7A:
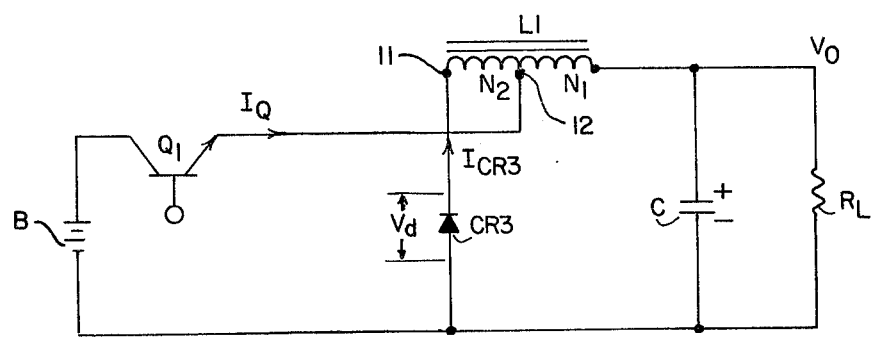
FIGS. 7a and 7b illustrates buck power converters corresponding to the converters of respective FIGS. 1 and 3 with the improvement of the present invention comprised of tapped inductance L1 and an additional switching diode CR3.
Figure 7B:
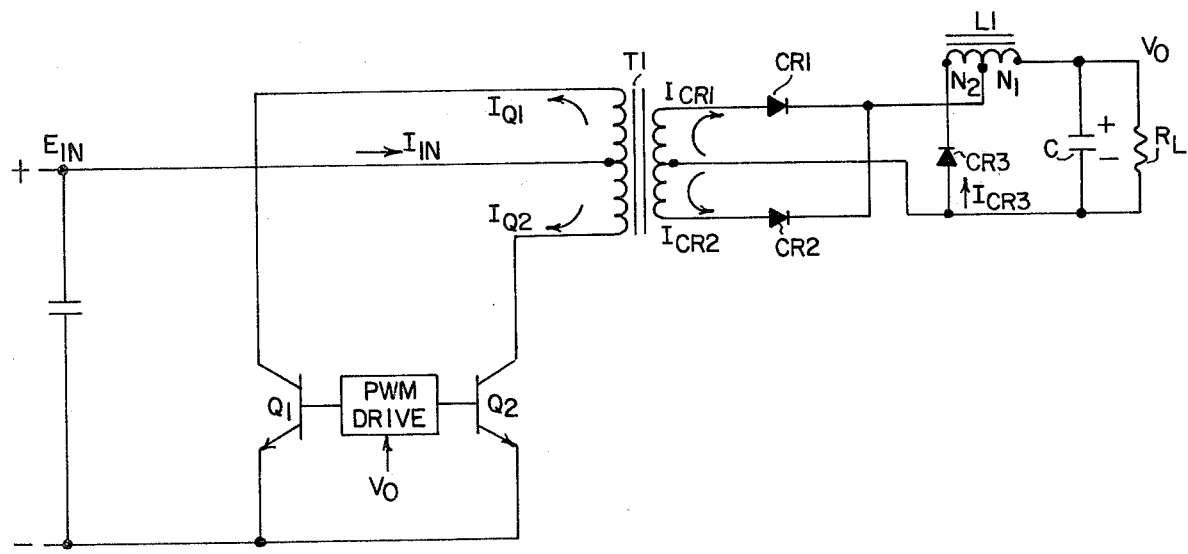

The effect of the diode currents not being zero prior to transistor turn-on is that the diode which is being turned off acts as a short circuit causing a large current to flow in the power transistor, as described with reference to FIGS. 1 and 2 for the basic buck converter. The effect of the unequal diode currents is that the transformer core saturates as shown in FIG. 5 which plots the hysterisis (B-H) loop of the transformer in terms of flux (B) as a function of amperes per turn (A/T) of the transformer. The core can not support any voltage once saturated so that the primary becomes short circuited. The current spikes of the power transistor being turned on are shown in FIG. 6. These undesirable characteristics can be eliminated by use of a tapped output inductor L1 and an additional diode CR3 as shown in FIGS. 7a and 7b. In the case of the buck power converter of FIG. 7a the commutating diode CR1 can be, and normally would be, eliminated because only the diode CR3 would conduct.

This new arrangement is very similar to the prior art. The difference is that the new converter has the tapped inductor, with "overwind" $N_2$, and the added diode CR3. The overwind back biases the transistor $Q_1$, and the diode CR1 if included, in the converter of FIG. 7a and the diodes CR1 and CR2 in the converter of FIG. 7b, causing them to turn off and causing current to flow through the diode CR3. When the diode CR3 is turned off, the inrush current is limited by the inductance of the overwind, which is the turns of the inductor between terminals 11 and 12 as shown in Fig. 7a. The spiking due to diode turn-off is eliminated with the proper amount of overwind. Since the diodes are turned off, a current imbalance does not exist in the secondary, and the core will not saturate in the converter of FIG. 7b.

The amount of overwind needed to turn off the two diodes CR1 and CR2, which is dependent on the leakage inductance of the output transformer T1, can be determined empirically. FIGS. 8 to 11 show the current flow through diode CR1 (or CR2) for different output inductor winding ratios. For the data shown in FIGS. 8 to 10, the output transformer was a C core which has a large leakage inductance (i.e. $L_l \approx 110 \mu h$). A toroidal core was used in FIG. 11, and it has a much smaller leakage inductance.

By varying the turns ratio of the two windings of inductor L1, control of the time in which the leakage current goes to zero can be effected. Thus the higher the reverse voltage to diodes CR1 and CR2, the faster the leakage current falls to zero.

Figure 12:
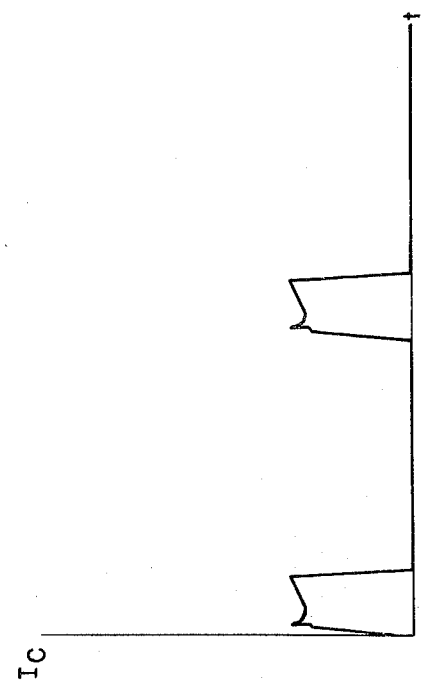
FIGS. 12 and 13 illustrate waveforms of collector-to-emitter voltage with and without the improvement of the present invention.
Figure 14:
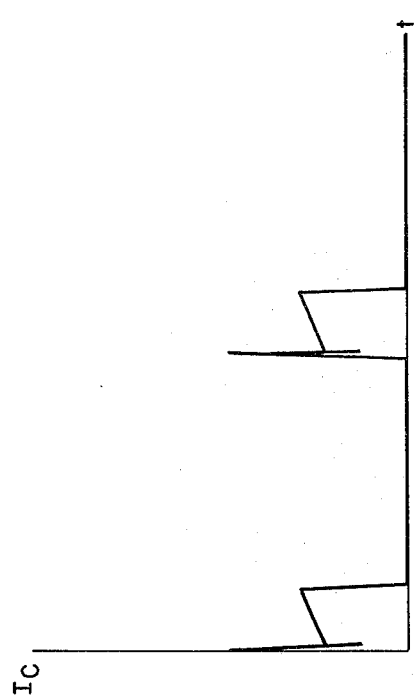
FIGS. 14 and 15 illustrate waveforms of collector current with and without the improvement of the present invention.
Figure 13:
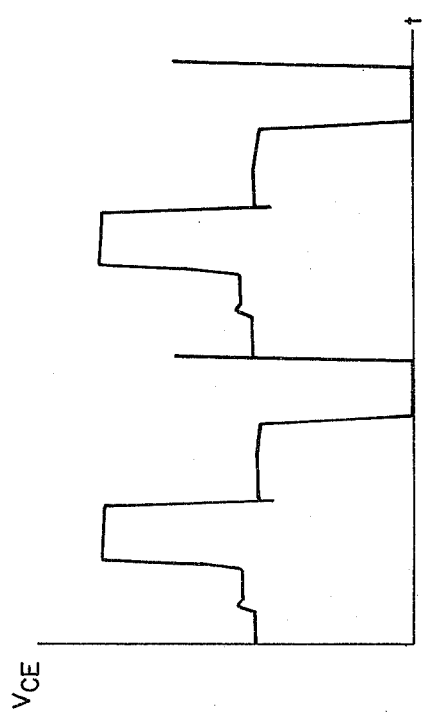
Figure 15:
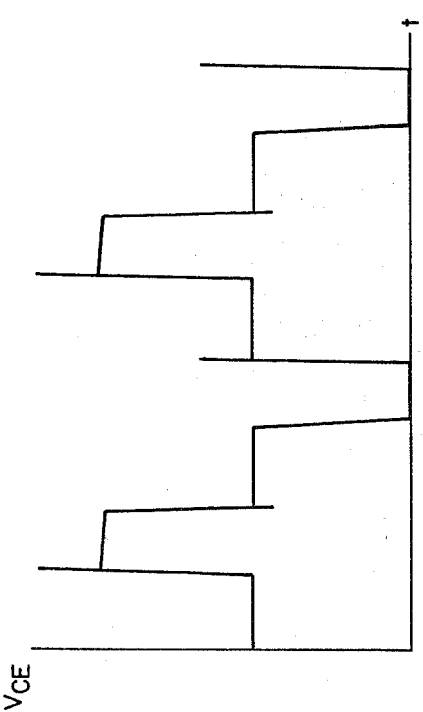

The voltage across the leakage inductance of the transformer is $$V - V_d = L_l(di_{cr}/dt)$$

$$V = (N_2/N)(V_O + V_d)$$

or $$(N_2/N)(V_O + 1) - 1 \approx L_l(\Delta i/\Delta t)$$

where:
$V_d$ is the diode voltage drop and it is assumed to be 1 volt.
$\Delta i \approx I_L$
$N = N_1 + N_2$
$L_l$ = leakage inductance of the secondary of the transformer
$\Delta t$ = time for current to decay to zero When the leakage inductance is small, as in the case of a toroidal core, the two rectifying diodes can be turned off very rapidly. FIGS. 12 and 13 show collector to emitter voltage with and without the tapped inductor, and FIGS. 14 and 15 show the collector current with and without the tapped inductor.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A buck converter having at least one switching power transistor for coupling a source of DC power to a load through an inductance in series with the load, and having at least one commutating diode for shunting the input of said inductance to the return current path of said load when said switching power transistor is off, the improvement comprising a tapped inductor for said inductor with a coupling from the tap thereof to said transistor and a connection of said commutating diode to one end of said tapped inductor remote from said load, said diode being polarized to conduct return current through said load when said switching power transistor is off, whereby current spikes due to minority-carrier sweepout time in the commutating diode is eliminated.

2. A buck converter as defined in claim 1 including a transformer for coupling said switching power transistor to said inductor with a rectifying diode in series between the secondary winding of said transformer and said tap of said tapped inductor.

3. A buck converter as defined in claim 1 including a second switching power transistor and a transformer for coupling said switching power transistors to said inductor, said transformer having a center tapped primary winding with ends thereof connected to said switching power transistors and the center tap thereof connected to a return current path for said source of power and a center tapped secondary winding with ends thereof connected to said tap of said tapped inductor through separate rectifying diodes, and means for alternately turning on said switching power transistors for a push-pull mode of operation.

4. In apparatus comprising a switching transistor, an inductor, a commutating diode and a filter capacitor for converting DC voltage from a source to DC voltage applied to a load by switching power through said transistor and inductor into said capacitor, said capacitor being connected in parallel with the load, the improvement comprising a tap in said inductor between ends thereof, said tap being connected to said transistor, and one end of said inductor, remote from the other end connected to said load, being connected by said commutating diode to the return current path from said load to said source, said commutating diode being polarized to conduct while said transistor is turned off, whereby current spikes due to minority-carrier sweepout time in the commutating diode is eliminated.

5. In apparatus comprising two switching transistors, means for alternately switching said transistors on, an inductor and filter capacitor, an isolating transformer having a center tapped primary winding and a center tapped secondary winding, with rectifying diodes coupling the ends of said secondary winding to said inductor in series with a load, said load being connected in parallel with said capacitor between said inductor and the center tap of said secondary winding, for converting DC voltage from a source to DC voltage applied to said load by switching power through said transistor and isolating transformer in a push-pull mode, the improvement comprising a tap in said inductor between ends thereof, and a commutating diode, said tap being connected to said rectifying diodes, and one end of said inductor, remote from the other end connected to said load, being connected by said commutating diode to the center tap of said secondary winding of said isolating transformer, said diode being polarized to conduct while said transistors are turned off, whereby current spikes due to minority-carrier sweepout time in the commutating diode is eliminated.

6. In a buck power converter for converting DC voltage from a source to DC voltage applied to a load, said converter having a switching transistor and a commutating diode to alternately connect said source of DC voltage and circuit ground to an inductor in series with said load, the improvement comprising a tap in said inductor and a connection from said transistor instead of to one end of said inductor remote from said load where said commutating diode is connected, whereby current spikes due to minority-carrier sweepout time in the commutating diode is eliminated.

7. In a push-pull buck power converter for converting DC voltage from a source to DC voltage applied to a load, said converter having an isolating transformer with a center tapped primary winding and a center tapped secondary winding, two switching transistors, one transistor for connecting said source between the center tap of said primary winding and one end terminal thereof, the other transistor for connecting said source between the center tap of said primary winding and the other end terminal thereof, and means for alternately switching said transistor on for pulse width modulated intervals, two rectifying diodes connecting the ends of said secondary winding to an inductor in series with said load connected to the center tap of said secondary winding, the improvement comprising a tap in said inductor and a connection from said rectifying diodes to said tap in said inductor instead of to an end thereof remote from the load, and a commutating diode connected between the end of said tapped inductor remote from said load and the center tap of said secondary winding of said isolating transformer, whereby current spikes due to minority-carrier sweepout time in the commutating diode is eliminated.

* * * * *